United States Patent Office 3,524,866
Patented Aug. 18, 1970

3,524,866
ALPHA-SUBSTITUTED BETA-LACTONES STABILIZED WITH AROMATIC DIAZONIUM SALTS
Arie Klootwijk, deceased, late of Purmerend, Netherlands, by Johanna Maria Klootwijk, personal representative, Purmerend, Netherlands, and Willem M. Wagner and Jannetje De Waal, Amsterdam, Netherlands, assignors to Shell Oil Company, New York, N.Y., a corporation of Delaware
No Drawing. Filed Nov. 29 1967, Ser. No. 687,419
Claims priority, application Great Britain, June 5, 1967, 25,838/67
Int. Cl. C07d 3/00
U.S. Cl. 260—343.9     3 Claims

ABSTRACT OF THE DISCLOSURE

Stabilizing α-substituted β-lactones by intimately contacting the lactone with a minor amount of an aromatic diazonium salt of a complex fluoro acid represented by the formula $$[Ar-N\equiv N]_n^+ [AF_x]^{n-}$$

where Ar is an aryl group, A is the central atom in the complex fluoro acid anion, n is the valence of the anion and an integer from 1 to 4 and x is an integer from 4 to 8. The resulting stabilized compositions, comprising a β-lactone substituted on the alpha carbon thereof with from 1 to 2 alkyl substituents and a minor amount of the diazonium salt, are characterized by an enhanced stability during storage as shown by a reduced tendency toward autopolymerization.

BACKGROUND OF THE INVENTION

α-Substituted β-lactones are of interest as precursors of polymeric materials useful in the production of synthetic fibers. Such homopolymeric polyesters, when of high molecular weight, are highly crystalline products and have high melting points, each of which is a desirable and useful property. The lactone monomers, however, are unstable and tend to polymerize during storage and transport, particularly at elevated temperature, to form less desirable polymers of low molecular weight, thereby rendering more difficult the subsequent production of high-molecular-weight polymer. It is therefore of advantage to provide a method for enhancing the stability of the lactone monomer and for retarding premature polymerization. J. C. Martin in U.S. Pat. 3,117,980, issued Jan. 14, 1964, discloses a method of stabilizing β-lactones by adding thereto certain nitrated phenols, e.g., picric acid. Such a procedure is not entirely satisfactory due to the known tendency of such phenols to decompose, which decomposition would lead to discoloration of the lactone monomer as well as polymers produced therefrom.

SUMMARY OF THE INVENTION

The present invention provides an improved method of stabilizing α-substituted β-lactones and the stabilized compositions thereby produced. This is accomplished by the process of intimately contacting an α-substituted β-lactone with a minor amount of an aromatic diazonium salt of a complex fluoro acid. The resulting stabilized compositions, comprising a β-lactone substituted on the alpha carbon atom thereof with from 1 to 2 alkyl substituents and a minor amount of the diazonium salt, are characterized by an increased stability at temperatures at or higher than those likely to be encountered during storage and transport as manifested by a greatly reduced tendency toward autopolymerization.

DESCRIPTION OF PREFERRED EMBODIMENTS

The α-substituted β-lactone which comprises the major component of the compositions of the invention is a β-lactone of at least one substituent other than hydrogen on the carbon atom alpha to the carboxy moiety. One class of such lactones comprises those lactones of from 4 to 10 carbon atoms of the formula $$\begin{array}{c} R \\ | \\ R'-C-C=O \\ | \quad\quad | \\ H_2C-O \end{array} \quad\quad (I)$$

wherein R is an alkyl of up to 7 carbon atoms and R' is hydrogen or R. Illustrative of such lactones are α-methyl-β-propiolactone, α-ethyl-β-propiolactone, α-butyl-β-propiolactone, α,α-dimethyl-β-propiolactone, α,α-diethyl-β-propiolactone, α-ethyl-α-tert-butyl-β-propiolactone and α-methyl-α-hexyl-β-propiolactone. In general, preferred lactones of the above Formula I are those wherein both R and R' are alkyl, and particularly satisfactory are compositions wherein the lactone component is α,α-dimethyl-β-propiolactone. In addition to the α-substituted β-lactones, the compositions may contain minor amounts, i.e., up to 50% by weight, based on α-substituted β-lactone, of other lactones such as β-propiolactone and ε-caprolactone.

The above-described α-substituted β-lactones are stabilized by intimately contacting the lactone with a minor proportion of an aromatic diazonium salt of a complex fluoro acid. The salt may be represented by the formula $$[Ar-N\equiv N]_n^+ [AF_x]^{n-} \quad\quad (II)$$

wherein Ar is an aryl group, A is the central atom in the complex fluoro acid, anion, n is the valence of the anion and an integer from 1 to 4, and x is an integer from 4 to 8.

Most elements may function as central atom in complex fluoro acid anions; see A. G. Sharpe, in J. H. Simons, "Fluorine Chemistry," vol. II, 1–33, Academic Press, New York, 1954. Notatable exceptions are the alkali and alkaline earth metals, excluding beryllium; carbon; nitrogen; oxygen; sulfur; the other halogens, e.g., chlorine, and the noble gases. Illustrative of complex fluoro acid anions of diazonium salt stabilizers suitable for use in the compositions of the invention are $CuF_6^{-3}$, $AuF_4^{-1}$, $BeF_4^{-2}$, $ZnF_4^{-2}$, $BF_4^{-1}$, $AlF_6^{-3}$, $ScF_6^{-3}$, $SiF_6^{-2}$, $SnF_6^{-2}$, $PbF_8^{-4}$, $TiF_6^{-3}$, $PF_6^{-1}$, $SbF_4^{-1}$, $BiF_6^{-1}$, $VF_6^{-3}$, $CrF_6^{-3}$, $UF_6^{-2}$, $MnF_6^{-3}$, $FeF_6^{-3}$ and $NiF_4^{-2}$. Particularly preferred stabilizers are those in which the anion is the tetrafluoroborate, $BF_4^{-1}$, or the hexafluorophosphate $PTF_6^{-1}$.

The diazonium cation portion of the diazonium salt stabilizers is derived from diazotization of an aromatic primary amine. The aromatic primary amine may be further substituted with chloro, nitro, alkyl, alkoxy and even additional amino groups. Illustrative of such aromatic primary amines are aniline, o-toluidine, m-chloroaniline, 2,5-dichloroaniline, m-nitroaniline, α-naphthylamine, o-anisidine, benzidine and the like. It is required that the stabilizer be free of active hydrogens; thus, when utilizing an aromatic diamine, both amino groups should be diazotized yielding, for example, with p-phenylenediamine, benzene-1,4-bis(diazonium hexafluorophosphate).

Illustrative of a particularly preferred group of diazonium salt stabilizers is a diazonium salt wherein the diazonium cation is that derived from a chloro- or nitro-substituted aniline and the complex fluoro acid anion is one in which the central atom is an element with a highest valent state of 3 or 5 and is in its highest valent state, e.g., boron or phosphorus. This group may be represented by the formula

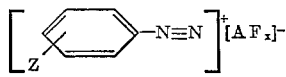

where Z is chloro or nitro, A is an element with a highest valent state of 3 or 5 and is in its highest valent state, and x is the integer 4 or 6.

The stabilizer is employed in a relatively minor amount. Effective stabilization is obtained when the amount of stabilizer employed in the lactone composition is from about 0.0001% mole to about 0.5% mole based on the total amount of composition. Amounts of stabilizer from about 0.001% mole to about 0.005% mole on the same basis are preferred.

The stabilized compositions are prepared by intimately contacting the lactone with the stabilizer, thereby obtaining an essentially homogeneous mixture. The precise method of obtaining intimate contacting is not critical and methods such as dissolving, shaking, stirring and the like are suitable.

As previously stated the process of the invention is useful in providing compositions comprising the α-substituted β-propiolactone which exhibit enhanced storage and thermal stability as shown by a reduced tendency toward the autopolymerization generally exhibited by unstabilized β-propiolactones. The stabilized compositions are polymerizable by known catalytic methods to high-molecular-weight polymers without appreciable deteriment arising from the presence of the stabilizer. If desired, however, the stabilizer is separated from the lactone monomer prior to polymerization by conventional methods, e.g., flash distillation or selective extraction.

The stabilized lactone compositions are particularly useful in providing precursors of high-molecular-weight polymers due to the relatively small proportions of low-molecular-weight polymer formed during the storage and handling of the lactone monomer composition prior to polymerization.

EXAMPLE 1

A series of compositions was prepared by adding to samples of α,α-dimethyl-β-propiolactone controlled amounts of diazonium salt stabilizers. In each case, the stabilizing effect was measured by maintaining the composition at 100° C. and determining the time required for the formation of 0.1% wt. of polymer. The results of the examination of these compositions are shown in Table I wherein the term "Time" is the time in hours required for the formation of 0.1% wt. of polymer.

It should be appreciated that the temperature employed for the comparison is somewhat higher than those likely to be encountered in commercial storage and transport of the α-substituted β-lactones. This temperature is utilized for accelerated testing and the stability imparted by the stabilizers at lower temperature, i.e., those more likely to be encountered in normal storage and transport of the lactone monomers, will be even greater.

TABLE I

| Stabilizer | Conc., percent mole | Time |
|---|---|---|
| None | 0 | <0.1 |
| 4-chlorobenzenediazonium hexafluorophosphate | 0.001 | 48 |
| 4-nitrobenzenediazonium tetrafluoroborate | 0.001 | 90 |

For purposes of comparison, a composition was prepared containing 0.001% mole of picric acid. When treated in identical manner, the time required for formation of 0.1% wt. of polymer was 20 hours.

EXAMPLE 2

In a manner similar to that described in Example 1, stability tests were carried out at 40° C. with α,α-dimethyl-β-propiolactone compositions containing from 0.1 to 0.001% mole of 4-chlorobenzenediazonium hexafluorophosphate. In each case the time required for formation of 0.1% wt. of polymer was more than 1500 hours except for the composition containing 0.001% mole of the stabilizer wherein the time was 1400 hours. With α,α-dimethyl-β-propiolactone containing 0.015% mole of 4-nitrobenzenediazonium tetrafluoroborate, the time required for formation of 0.1% wt. of polymer at 40° C. was 300 hours.

EXAMPLE 3

This example demonstrates that the stabilized compositions are polymerizable without appreciable deteriment arising from the persence of the stabilizer.

Compositions containing 0.001, 0.005 and 0.01% mole, respectively, of 4-chlorobenzenediazonium hexafluorophosphate as stabilizer were diluted with an aviation alkylate, yielding 7% wt. solution of α,α-dimethyl-β-propiolactone. Polymerization of each composition was conducted by adding to each solution 0.4% mole of triphenylphosphine and then heating the resulting mixture at 100° C. for 20 hours. A high-molecular-weight polymer was obtained in each case.

We claim as our invention:
1. A composition consisting essentially of (a) α,α-dimethyl-β-propiolactone and (b) from about 0.0001% mole to about 0.5% mole based on the total composition of a aromatic diazonium salt of a complex fluoro acid of the formula

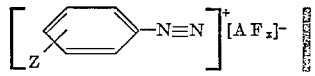

wherein Z is chloro or nitro, x is the integer 4 or 6, and A is the element boron when x is 4 or the element phosphorous when x is 6.

2. The composition of claim 1 wherein the aromatic diazonium salt is 4-chlorobenzenediazonium hexafluorophosphate.

3. The composition of claim 1 wherein the aromatic diazonium salt is 4-nitrobenzenediazium tetrafluoroborate.

References Cited

UNITED STATES PATENTS 3,394,149  7/1968  Klootwijk _____ 260—343.9

ALEX MAZEL, Primary Examiner

A. M. T. TIGHE, Assistant Examiner

U.S. Cl. X.R.

252—403; 260—141, 78.3